United States Patent
Ma et al.

(10) Patent No.: US 8,954,807 B2
(45) Date of Patent: Feb. 10, 2015

(54) FAULT-BASED SOFTWARE TESTING METHOD AND SYSTEM

(71) Applicant: Electronics & Telecommunications Research Institute, Daejeon (KR)

(72) Inventors: Yu Seung Ma, Daejeon (KR); Duk Kyun Woo, Daejeon (KR); Seon Tae Kim, Daejeon (KR); Pyeong Soo Mah, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 99 days.

(21) Appl. No.: 13/645,555

(22) Filed: Oct. 5, 2012

(65) Prior Publication Data

US 2014/0013164 A1 Jan. 9, 2014

(30) Foreign Application Priority Data

Jul. 5, 2012 (KR) ........................ 10-2012-0073379

(51) Int. Cl.
G06F 11/00 (2006.01)

(52) U.S. Cl.
USPC ........................................... 714/41; 714/38.1

(58) Field of Classification Search
CPC ....................................................... G06F 11/36
USPC .................. 714/38.1, 37, 38.12, 38.13, 41
See application file for complete search history.

(56) References Cited

U.S. PATENT DOCUMENTS

| | | | |
|---|---|---|---|
| 6,701,460 B1 * | 3/2004 | Suwandi et al. | 714/41 |
| 6,826,194 B1 * | 11/2004 | Vered et al. | 370/449 |
| 7,464,374 B2 * | 12/2008 | Latten et al. | 717/125 |
| 7,707,559 B2 * | 4/2010 | Reddy | 717/131 |
| 2008/0134160 A1 | 6/2008 | Belapurkar et al. | |
| 2010/0287412 A1 | 11/2010 | Cha et al. | |
| 2011/0289487 A1 * | 11/2011 | Song | 717/130 |

FOREIGN PATENT DOCUMENTS

| | | |
|---|---|---|
| KR | 10-2010-0121225 A | 11/2010 |
| KR | 10-2011-0008849 A | 1/2011 |

OTHER PUBLICATIONS

A. Jefferson Offutt et al., "An Experimental Determination of Sufficient Mutant Operators," ACM Transactions on Software Engineering and Methodology, vol. 5, No. 2, Apr. 1996, pp. 99-118.

* cited by examiner

Primary Examiner — Dieu-Minh Le
(74) Attorney, Agent, or Firm — Rabin & Berdo, P.C.

(57) ABSTRACT

A fault-based software testing method and system are provided. The fault-based software testing method includes: generating a plurality of error programs by injecting faults into a testing target program; grouping the generated error programs into a plurality of groups with respect to respective test data, and selecting representative error programs with respect to the respective groups; and when an error is detected in the execution result of the representative error programs with respect to the corresponding test data, determining that errors are detected in all the error programs of the corresponding group.

9 Claims, 5 Drawing Sheets

| ERROR PROGRAM | ERROR CODE | t₁ (A=4, B=2) | | t₂ (A=4, B=4) | |
|---|---|---|---|---|---|
| | | INTERMEDIATE RESULT | FINAL RESULT | INTERMEDIATE RESULT | FINAL RESULT |
| ROR1 | A ≥ B | True | 2 | True | 0 |
| ROR2 | A < B | False | 6 | False | 8 |
| ROR3 | A ≤ B | False | 6 | True | 0 |
| ROR4 | A == B | False | 6 | True | 0 |
| ROR5 | A! = B | True | 2 | False | 8 |

FAULT-BASED SOFTWARE TESTING METHOD AND SYSTEM

CLAIM FOR PRIORITY

This application claims priority to Korean Patent Application No. 10-2012-0073379 filed on Jul. 5, 2012 in the Korean Intellectual Property Office (KIPO), the entire contents of which are hereby incorporated by reference.

BACKGROUND

1. Technical Field

Example embodiments of the present invention relate in general to a method and apparatus for evaluating the quality of software, and more specifically, to fault-based software testing technology for evaluating the quality of software through fault injection. In particular, examples of the present invention relate in general to a fault-based software testing method and system capable of reducing time and cost for software testing.

2. Related Art

Fault-based testing refers to a method that selects test data, focusing on finding types of errors, based on the predictive knowledge that the types of errors having occurred frequently in the past are likely for the system, system components or programs under testing.

Such fault-based testing may be applied to software engineering. Fault-based testing for a developed program (testing target program) is performed by generating a plurality of error programs through artificial fault injection with respect to the testing target program, and executing the generated error programs by using test data.

FIG. 1 is a block diagram illustrating a general configuration of a conventional fault-based software testing system.

Referring to FIG. 1, the conventional fault-based software testing system 100 may include an error program generating unit 110 and a testing unit 120.

The error program generating unit 110 receives a testing target program and an error type list, analyzes the testing target program, and generates errors corresponding to the received error type list.

In this case, types of errors mean the types of errors predicted to occur frequently in a system. In the case of software, examples of the types of frequent errors include wrong use of an arithmetic operator (for example, wrong use of an arithmetic operator '−' instead of an arithmetic operator '+'), wrong use of a logical operator (for example, wrong use of a logical operator '≥' instead of a logical operator '>'), and the like.

The results of the error program generating unit 110 are mutants resulting from the modification of the testing target program according to the given types of errors. FIG. 1 illustrates a case where M error programs, including an error program #1, an error program #2, ..., an error program #M, are generated.

The generated error programs are executed through the testing unit 120. The error programs are executed using a testing set, which is a set of M test data, until errors caused by codes modified by the error program generating unit 110 are found.

FIG. 2 is a flowchart illustrating an example of the operation of the testing unit in the fault-based software testing system.

Referring to FIG. 2, the testing unit 120 executes the M error programs by using the testing set including M test data.

First, in step S210, all elements arranged in an error detection flag Error[ ], which represents whether an error is detected in a relevant error program, are set to 'UNDETECTED' indicating a state that no error is detected.

Then, using a variable i (i=1, ..., N) indicating the test data and a variable j (j=1, ..., M) indicating the error programs, the error programs are executed with respect to the respective test data, and it is determined whether errors by the error programs are detected (S220 and S221).

It is determined whether an error has already been detected in a relevant error program j by other test data (S222). When the error has already been detected in the error program, the execution of the corresponding test data is omitted. The error program j is executed using test data i (S223), and it is determined whether an error is detected (S224). When no error is detected, a next error program ((j+1)th error program) is executed and the process repeats the above steps from step S222. When an error is detected, an error detection flag Error [j] for the error program j is set to 'DETECTED' (S225).

The conventional fault-based testing system uses too much time and money on the generation and execution of error programs. For reference, according to the paper, "An experimental determination of sufficient mutation operators," (A. J. Offutt, Ammei Lee, G. Rothermel, R. Untch and C. Zapf. "A experimental determination of sufficient mutation operators.", ACM Transaction of Software engineering methodology, 5(2):99-118, April 1996), when the testing method (mutation testing) described in detail with reference FIG. 2 was used for simple program codes of 28 lines, 951 error programs were generated, and the number of error programs generated was rapidly increased as the size of the program became larger.

That is, as in the procedures of the fault-based testing exemplified in FIG. 2, the error programs are repetitively executed until the corresponding errors are detected. In the case of the mutation testing, one of the fault-based testing methods, it takes a long time to repetitively execute the error programs because a large number of error programs are generated.

SUMMARY

Accordingly, example embodiments of the present invention are provided to substantially obviate one or more problems due to limitations and disadvantages of the related art.

Example embodiments of the present invention provide a fault-based software testing method capable of reducing costs of fault-based testing by reducing the number of times error programs are executed in a mutation testing, which is one of fault-based testing methods.

Example embodiments of the present invention also provide a fault-based software testing system capable of reducing costs of fault-based testing by reducing the number of times error programs are executed in a mutation testing, which is one of fault-based testing methods.

In some example embodiments, a fault-based software testing method includes: (a) generating a plurality of error programs by injecting faults into a testing target program; (b) grouping the generated error programs into a plurality of groups with respect to at least one test data, and selecting one or more representative error programs with respect to the respective groups; and (c) executing the representative error programs with respect to corresponding test data, and when an error is detected in the execution result, determining that errors are detected when the entire group of error programs, to which the representative error programs belong, are executed with respect to the corresponding test data.

Step (a) may include: analyzing the testing target program; generating faults corresponding to an input error type list; and generating the plurality of error programs by injecting the generated faults into the testing target program. The error type list may include types of errors predicted to occur frequently in a system of the same type as the testing target program.

Step (b) may include: grouping error programs into the same group when the error programs produce the same results with respect to given test data; and selecting at least one or more error programs, which belong to the respective groups, as representative error programs of the respective groups.

The process of finding the error programs producing the same results with respect to the given test data may include determining error programs, which produce the same intermediate results with respect to given test data, as error programs, which produce the same final results.

In other example embodiments, a fault-based software testing system includes: an error program generating unit configured to receive a testing target program and an error type list, analyze the testing target program, generate faults corresponding to the received error type list, and generate a plurality of error programs by injecting the generated faults into the testing target program; an error program grouping unit configured to group the generated error programs into a plurality of group with respect to at least one test data, and select at least one or more representative error programs with respect to the respective groups; a representative error program executing unit configured to execute the representative error programs, which are selected by the error program grouping unit, with respect to corresponding test data; and a test result analyzing unit configured to determine that errors are detected in the entire group of error programs, to which the representative error programs belong, when an error is detected in a representative error program execution result of the representative error program executing unit.

The error type list input to the error program generating unit may include types of errors predicted to occur frequently in a system of the same type as the testing target program.

The error program grouping unit may group error programs into the same group when the error programs produce the same results with respect to given test data, and selects at least one or more error programs, which belong to the respective groups, as representative error programs of the respective groups. The process of finding the error programs producing the same results with respect to the given test data by the error program grouping unit may include determining error programs, which produce the same intermediate results with respect to given test data, as error programs, which produce the same final results.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
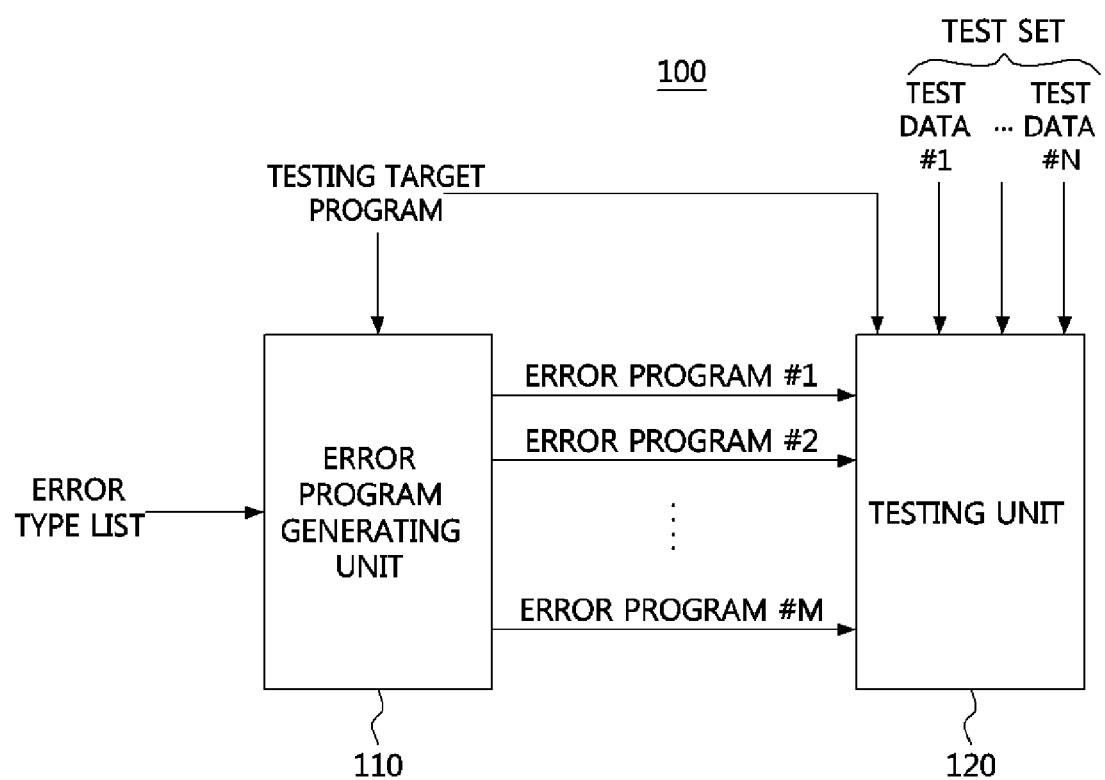
FIG. 1 is a block diagram illustrating a general configuration of a conventional fault-based software testing system.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, example embodiments of the present invention will be described in detail with reference to the accompanying drawings.

Figures 3, 4:
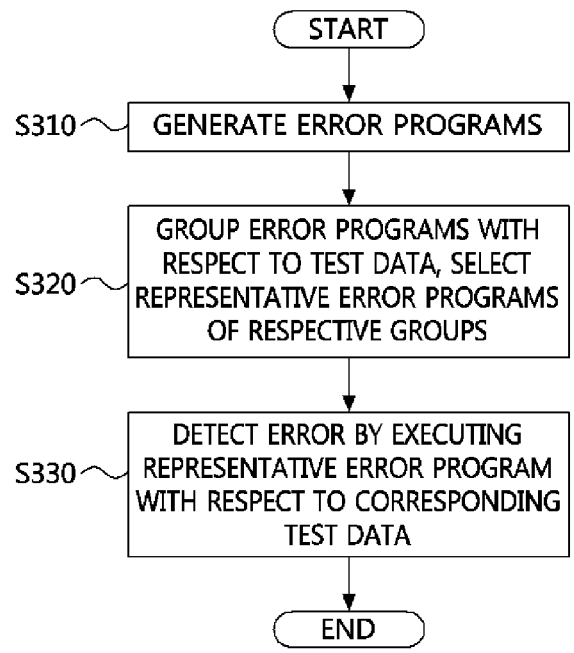
FIG. 3 is a flowchart illustrating a fault-based software testing method according to an example embodiment of the present invention.
FIG. 4 is a program execution result table describing an example of an error program grouping method according to an example embodiment of the present invention.

FIG. 3 is a flowchart illustrating a fault-based software testing method according to an example embodiment of the present invention.

Referring to FIG. 3, the fault-based software testing method according to the example embodiment of the present invention may include: generating a plurality of error programs by injecting faults into a testing target program (S310); grouping the generated error programs into a plurality of groups with respect to at least one test data, and selecting at least one or more representative error programs with respect to the respective groups (S320); and executing the representative error programs with respect to corresponding test data, and when an error is detected in the execution result, determining that errors are detected when the entire group of error programs, to which the representative error programs belong, are executed with respect to the corresponding test data (S330).

In step S310, a testing target program and an error type list are received, and the testing target program is analyzed. A plurality of error programs are generated by injecting faults corresponding to the received error type list. In this case, types of errors included in the error type list mean the types of errors predicted to occur frequently in a system.

Examples of the types of frequent errors include wrong use of an arithmetic operator, wrong use of a logical operator, and the like.

Then, in step S320, the generated error programs are grouped into a plurality of groups with respect to at least one test data set, and at least one or more representative error programs are selected with respect to the respective groups.

In this case, as a representative method of grouping the error programs, error programs producing the same results with respect to given test data are grouped into the same group.

A method for determining the programs producing the same results is required in order to group the programs producing the same results with respect to the given test data in step S320. As an example of the error program grouping method of step S320, intermediate states (results) of the programs are compared and, when the intermediate states (results) are equal to each other, the final results are determined as being equal to each other. The error programs having the same intermediate states may be grouped into the same group.

An example of the error program grouping method proposed herein will be described with reference to the following program code:

```
1    int myFunction(int A, int B){
2        int C;
3        if(A>B) //fault injection position
4            C=A-B;
5        else
6            C=A+B;
7        return;
8    }
```

As shown in the exemplary program code, it is assumed that an error program is generated by modifying a logical operation '>' in the sentence of the third line in an 8-line myFunction function.

FIG. 4 is a program execution result table for describing an example of an error program grouping method according to an example embodiment of the present invention.

Referring to FIG. 4, the above-described program code example may be modified into five error programs ROR1, ROR2, ROR3, ROR4 and ROR5 by the modification of the logical operator '>'. The modified codes are shown in an "error code' item of the table of FIG. 4.

FIG. 4 illustrates the final execution results with respect to two test data t1 and t2. According to the results of FIG. 4, it can be seen from the given example that the final results are the same when the intermediate results are the same. For reference, the grouping is different according to the test data. With respect to the test data t1, the groups {{ROR1, ROR5}, {ROR2, ROR3, ROR4}} are generated. With respect to the test data t2, the groups {{ROR1, ROR3, ROR4}, {ROR2, ROR5}} are generated. Therefore, it is necessary to perform the error program grouping process according to the test data.

When the grouping of the error programs is completed with respect to the given test data, at least one or more error programs belonging to the respective groups are selected as representative error programs of the respective group.

Then, in step S330, the representative error programs are executed with respect to the corresponding test data. When an error is detected in the execution result, it is determined that an error is detected when the entire group of error programs, to which the representative error programs belong, are executed with respect to the corresponding test data. In this case, it is necessary to perform the representative error programs with respect to the corresponding test data. This is because the grouping of the error programs is different according to the test data, and thus, a correspondence relationship occurs in the representative error programs according to the test data.

Figure 5:
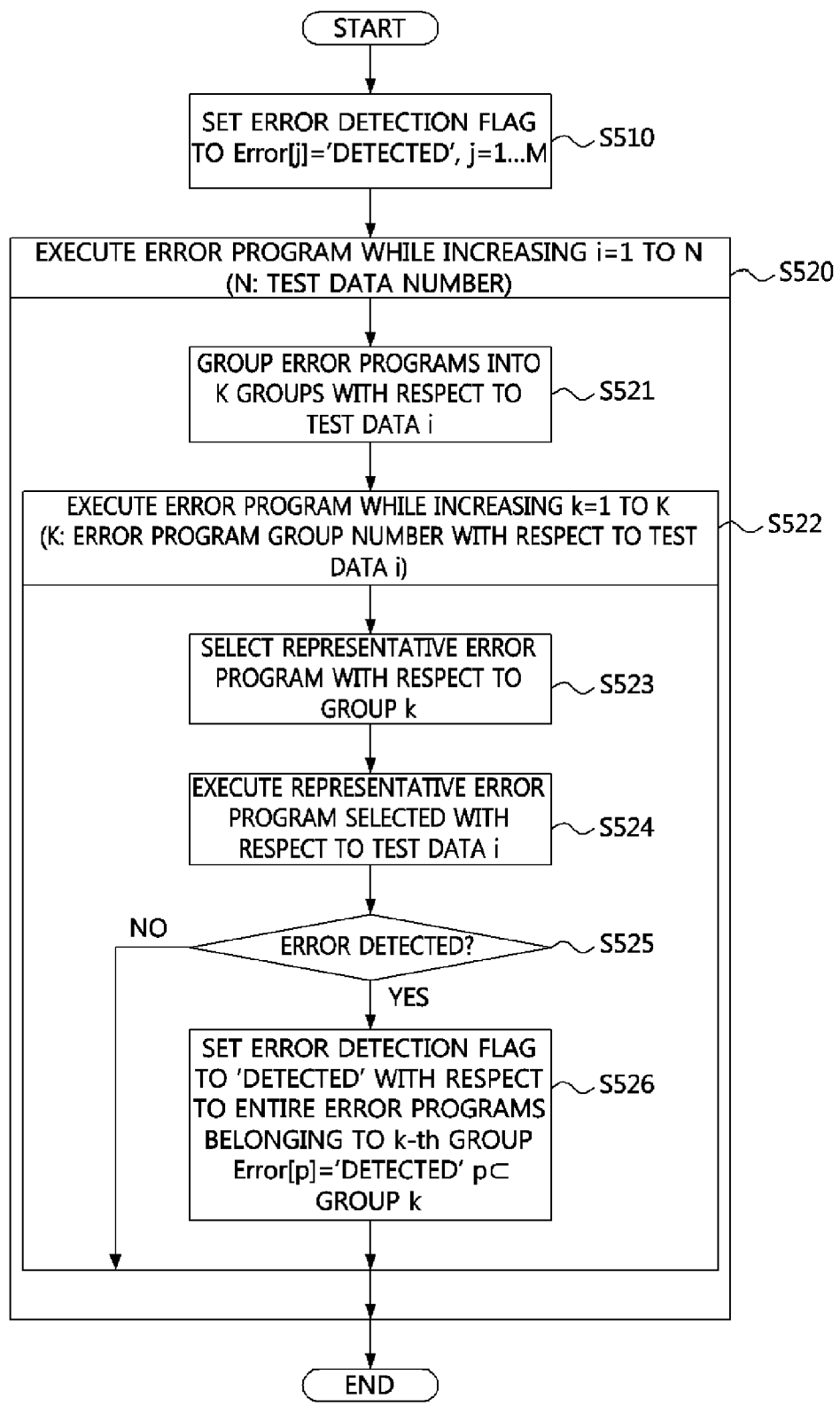
FIG. 5 is a flowchart illustrating in more detail a fault-based software testing method according to an example embodiment of the present invention.

FIG. 5 is a flowchart illustrating in more detail an example of a fault-based software testing method according to an example embodiment of the present invention.

Steps S320 and S330 of FIG. 4 will be described in more detail with reference to FIG. 5. It is noted that steps S510 to S526 of FIG. 5 are given for describing steps S320 and S330 of FIG. 4 in more detail, and are not steps subsequent to steps S320 and S330.

In step S510, the error detection flag Error[ ], which represents whether an error is detected in a relevant error program (error program #1, . . . , #M), is set to 'UNDETECTED' indicating a state that no error is detected.

Then, using a variable i (i=1, . . . , N) indicating the test data, the error programs are executed with respect to the respective test data, and it is determined whether errors by the error programs are detected (S520 and S526).

First, M error programs are grouped into K groups with respect to the test data i (S521). In this case, the process of grouping the error programs may be performed by step S320 described with reference to FIGS. 3 and 4, and a value of K may be less than a value of M.

When the M error programs are grouped into the K groups with respect to the test data i, a representative error program is selected with respect to the group k (k=1, . . . , K) (S523), and a representative error program selected with respect to the test data i is executed (S524). It is determined whether an error is detected in the execution result of the representative error program (S525). When the error is detected, it is determined that errors are detected in the entire group of error programs to which the corresponding representative error program belongs, and error detection flags of the corresponding error programs are set to a 'DETECTED' state (S526).

Figure 2:
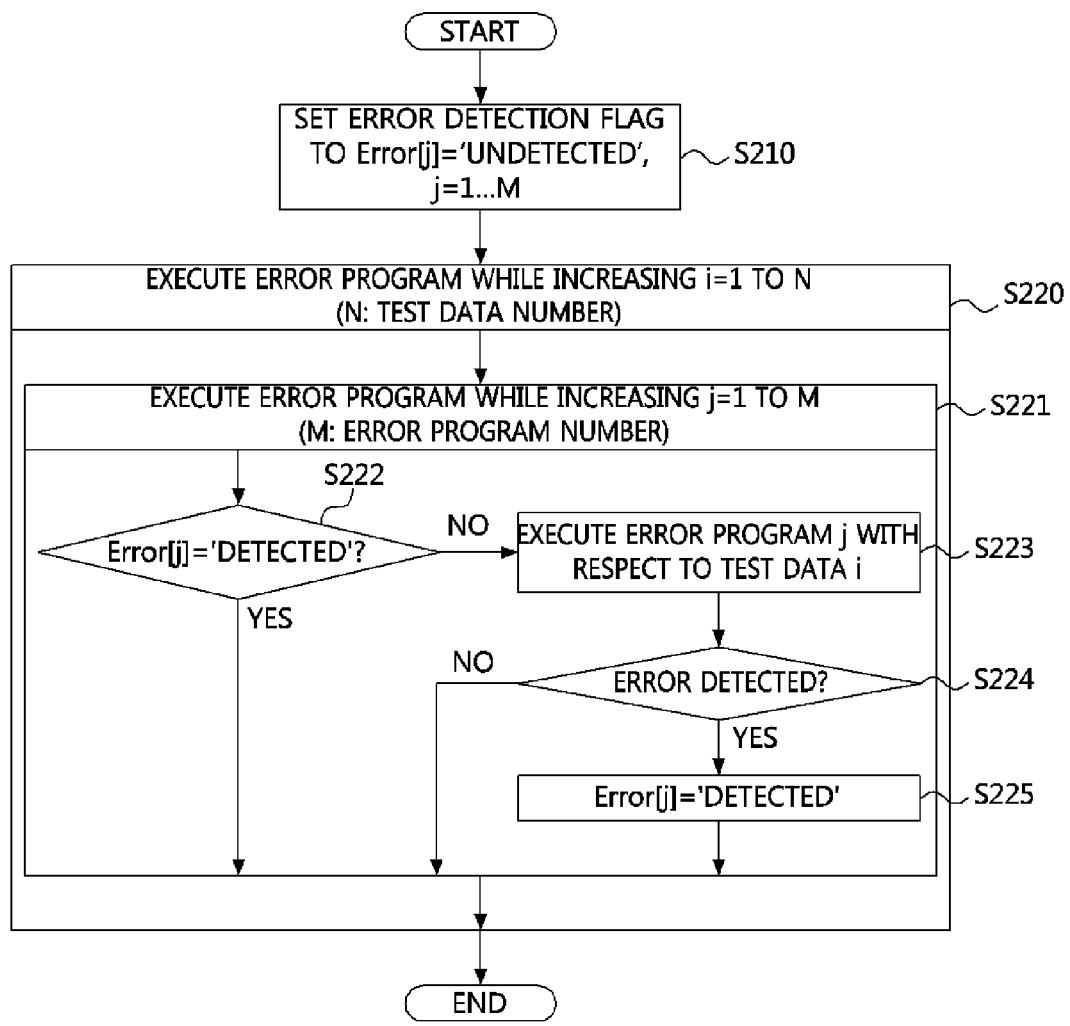
FIG. 2 is a flowchart illustrating an example of an operation of a testing unit in a fault-based software testing system.

When comparing FIG. 2 with FIG. 5, the number of times the error programs are executed with respect to the given test data in the conventional error program executing method of FIG. 2, is the number of error programs from which no errors are detected. However, in the example embodiment of the present invention, the number of times the error programs are executed is reduced to the number of the groups. When the number of the groups is very small as compared to the number of the error programs, test execution costs may be significantly reduced.

Figure 6:
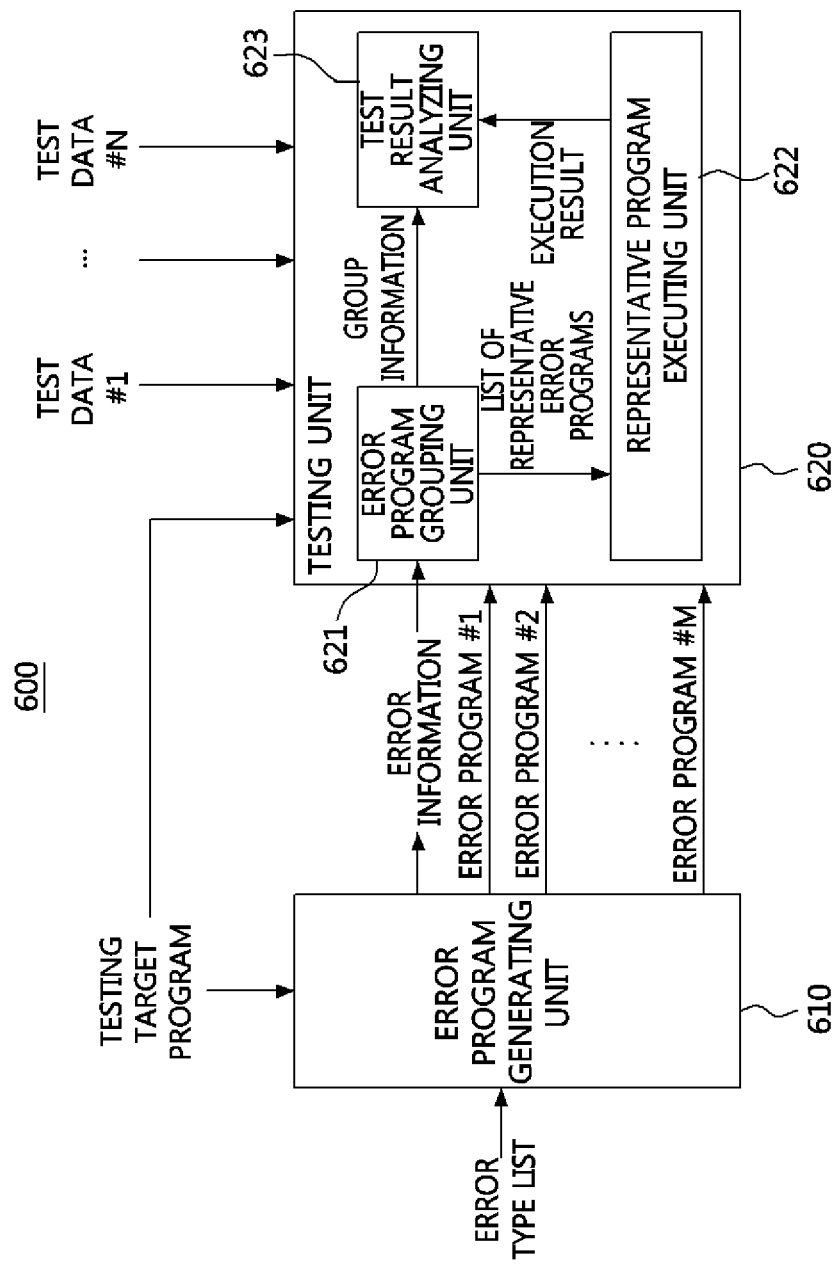
FIG. 6 is a block diagram of a configuration of a fault-based software testing system according to an example embodiment of the present invention.

FIG. 6 is a block diagram a configuration of a fault-based software testing system according to an example embodiment of the present invention.

Referring to FIG. 6, the fault-based software testing system 600 according to the example embodiment of the present invention may include an error program generating unit 610 and a testing unit 620. The testing unit 620 may include an error program grouping unit 621, a representative error program executing unit 622, and a test result analyzing unit 623.

The error program generating unit 610 receives a testing target program and an error type list, analyzes the testing target program, and generates faults corresponding to the received error type list. In this case, types of errors mean the types of errors predicted to occur frequently in a system.

Examples of the types of frequent errors include wrong use of an arithmetic operator, wrong use of a logical operator, and the like. The results of the error program generating unit 610 are mutants resulting from the modification of the testing target program according to the given types of errors. FIG. 6 illustrates a case where M error programs, including an error program #1, an error program #2, ..., an error program #M, are generated.

Meanwhile, the error program generating unit 610 according to the example embodiment of the present invention additionally provides error information to the testing unit 620, as opposed to the conventional error program generating unit 110 of FIG. 1. The error information is brief information of errors inserted into the error programs. This information includes positions of codes, into which errors are inserted, and types of errors. This information is used as an input of the error program grouping unit 621, and is used for grouping the error programs.

The testing unit 620 may include the error program grouping unit 621, the representative error program executing unit 622, and the test result analyzing unit 623.

The error program grouping unit 621 groups error programs expected to produce the same results with respect to specific test data. Even though one error program among the grouped error programs is executed, the results of the remaining error programs may be known. That is, the execution results of one program within the group means the execution results of the other programs within the group. Therefore, only one program within each group has only to be executed through the error program grouping according to the example embodiment of the present invention, without executing the respective error programs as in the conventional method.

The representative error program executing unit 622 tests only the representative error programs received from the error program grouping unit 621 and the representative programs selected from the respective groups, and provides the test result to the test result analyzing unit 212.

The test result analyzing unit 623 checks other error programs belonging to the same group as the detected representative programs, and displays the detection of the checked error programs. This process is repeated with respect to the respective test data. This is because even though an error program 1 and an error program 2 produce the same results with respect to the test data 1, these error programs may not produce the same results with respect to the test data 2.

According to the configurations of the example embodiments of the present invention, error programs to calculate the same results with respect to given test data are grouped, and only one of the grouped error programs is executed. Therefore, the number of error programs actually being executed is reduced, which in turn reduces costs for fault-based testing. As more error programs are grouped, further cost reduction may be achieved.

While the example embodiments of the present invention and their advantages have been described in detail, it should be understood that various changes, substitutions and alterations may be made herein without departing from the scope of the invention.

What is claimed is:

1. A fault-based software testing method, comprising:
   (a) generating a plurality of error programs by injecting faults into a testing target program;
   (b) grouping the fault-injected error programs into a plurality of groups using a set of test data, and selecting at least one of the fault-injected error programs in each group as being a representative error program of said each group; and
   (c) executing the representative error program of each group using the set of test data, and upon detecting an error in a result of the execution, determining that the error is detected for all fault-injected error programs in said each group with respect to the set of test data.

2. The fault-based software testing method of claim 1, wherein step (a) comprises:
   analyzing the testing target program;
   receiving an error type list;
   generating the faults using the received error type list; and
   generating the plurality of error programs by injecting the generated faults into the testing target program.

3. The fault-based software testing method of claim 2, wherein the error type list includes types of errors predicted to occur frequently in a system of the same type as the testing target program.

4. The fault-based software testing method of claim 1, wherein the grouping comprises:
   grouping ones of the fault-injected error programs into a same group when the ones of the error programs produce a same result with respect to the set of test data.

5. The fault-based software testing method of claim 4, further comprising:
   finding the ones of the error programs producing the same result with respect to the set of test data, including identifying a set of the error programs that produce a same intermediate result with respect to the set of test data as being the ones of the error programs.

6. A fault-based software testing system, comprising:
   an error program generating unit configured to receive a testing target program and an error type list, analyze the testing target program, generate faults corresponding to the received error type list, and generate a plurality of error programs by injecting the generated faults into the testing target program;
   an error program grouping unit configured to group the fault-injected error programs into a plurality of groups using a set of test data, and select at least one of the fault-injected error programs in each group as being a representative error program for said each group;

a representative error program executing unit configured to execute the selected representative error program of each group using the set of test data; and a test result analyzing unit configured to determine, upon detecting an error in a result of the execution of a representative error program by the representative error program executing unit, that the error is detected in all fault-injected error programs in the group to which the representative error program belongs.

7. The fault-based software testing system of claim 6, wherein the error type list received by the error program generating unit includes types of errors predicted to occur frequently in a system of the same type as the testing target program.

8. The fault-based software testing system of claim 6, wherein the error program grouping unit is configured to group ones of the error programs into a same group when the ones of the error programs produce a same result with respect to the set of test data.

9. The fault-based software testing system of claim 8, wherein the error program grouping unit is configured to find the ones of the error programs producing the same result with respect to the set of test data by identifying a set of the error programs that produce a same intermediate result with respect to the set of test data as being the ones of the error programs.

* * * * *